United States Patent [19]
McKinney

[11] Patent Number: 4,986,702
[45] Date of Patent: Jan. 22, 1991

[54] FASTENER COLLAR REMOVER

[75] Inventor: Kevin D. McKinney, Wichita, Kans.

[73] Assignee: The Boeing Company, Seattle, Wash.

[21] Appl. No.: 512,183

[22] Filed: Apr. 20, 1990

[51] Int. Cl.$^5$ .............................................. B23B 49/02
[52] U.S. Cl. .................................. 408/54; 408/72 B; 408/84; 408/241 B
[58] Field of Search ...................... 29/426.4; 408/72 R, 408/72 B, 84, 97, 241 B, 241 S, 14, 54

[56] References Cited

U.S. PATENT DOCUMENTS

| | | |
|---|---|---|
| 1,916,414 | 7/1933 | Chapman . |
| 2,670,639 | 3/1954 | Flowers et al. ........................ 408/54 |
| 2,688,185 | 9/1954 | Brazil et al. ......................... 29/426.4 |
| 3,015,240 | 1/1962 | Hodnett ................................. 408/84 |
| 4,447,176 | 5/1984 | Blough et al. . |
| 4,646,413 | 3/1987 | Nall et al. ............................. 408/54 |
| 4,690,593 | 9/1987 | Nee et al. . |
| 4,822,216 | 4/1989 | Howard ........................... 408/241 B |

FOREIGN PATENT DOCUMENTS 707752 5/1980 U.S.S.R. .

Primary Examiner—Daniel W. Howell
Attorney, Agent, or Firm—Finnegan, Henderson, Farabow, Garrett & Dunner

[57] ABSTRACT

A device for removing a collar coaxially fixed to a projecting end of a fastener axially extending through the surface of a substrate, the device comprising a jig having opposed base and top surfaces and a cavity open at the base surface and disposed to coaxially receive the collar when the base surface is disposed on the substrate, at least one drill bit bushing extending through the jig on an axis generally parallel to and spaced a predetermined distance from the axis of the cavity, the bushing being disposed to guide a drill bit into engagement with the collar when disposed in the cavity, and an adjustable screw for controlling the axial length of drill bit extending through the bushing.

4 Claims, 2 Drawing Sheets

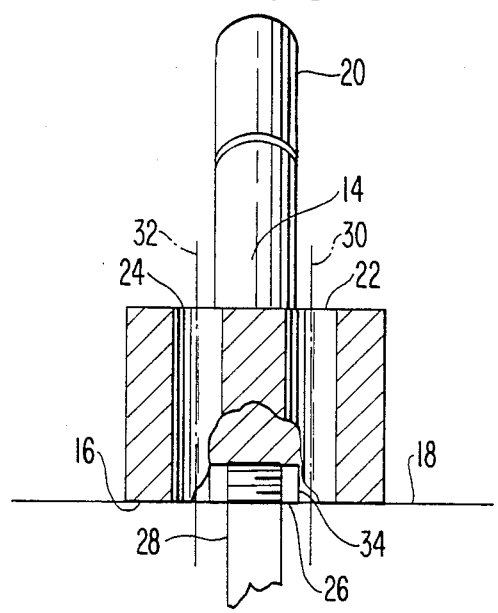

FASTENER COLLAR REMOVER

BACKGROUND OF THE INVENTION

1. Field of The Invention

The present invention relates to a device for removing a collar from a fastener.

2. Description of The Related Art

Various methods and devices are traditionally used for removing collars from fasteners. One such method employs a large power driven removal tool that is very awkward and impossible to maneuver into certain structural areas of a work object. In addition, use of this type of tool can load to damage to the work object. Another traditional method for removing a fastener and collar is to drill through the fastener and use a hammer and chisel to remove the collar. This method not only has the potential for causing structural damage to the work object but is also very time consuming.

U.S. Pat. No. 2,688,185 discloses a swaged fastener removal tool with a cylindrical cavity disposed to fit over the swaged collar of a bolt. A collar cutting rod offset from the longitudinal axis of the cavity may be hit with a hammer to cut the collar. Use of this type of device may lead to shock and impact damage to the work object. In addition, it may be impossible to use this device in tight areas where there is not enough room to swing a hammer.

Accordingly, it is an object of the present invention to provide a fastener collar remover that eliminates the risk of damage to the work object.

Another object of the present invention is to provide a fastener collar remover that is easy to use and can be used in tight areas.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects, and in accordance with the purposes of the invention as embodied and broadly described herein, there is provided a device for removing a collar coaxially fixed to a projecting end of a fastener axially extending through the surface of a substrate, the device comprising a jig having opposed base and top surfaces and a cavity open at the base surface and disposed to coaxially receive the collar when the base surface is disposed on the substrate, a drill bit bushing extending through the jig on an axis generally parallel to and spaced a predetermined distance from the axis of the cavity, the bushing being disposed to guide a drill bit into engagement with the collar when disposed in the cavity, and adjustment means for controlling the axial length of drill bit extending through the bushing.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 3 is a cross-sectional view taken along line III—III in FIG. 1.

DESCRIPTION OF THE PREFERRED EMBODIMENT

Reference will now be made in detail to the present preferred embodiment of the invention as illustrated in the accompanying drawings.

Figure 1:
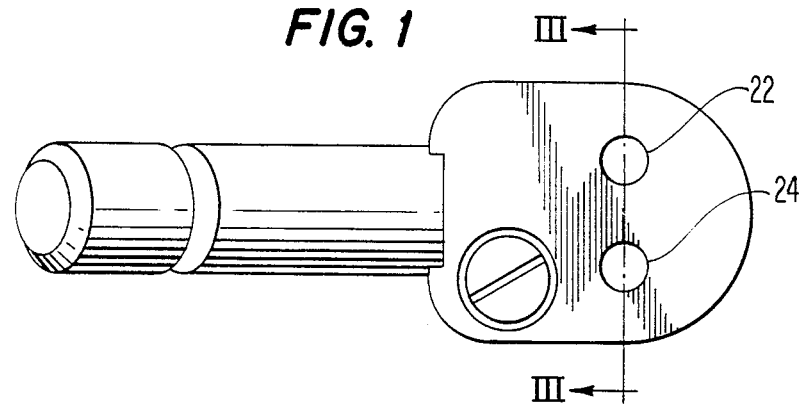
FIG. 1 is a top elevation of a fastener collar remover incorporating the teachings of the present invention.
Figure 2:
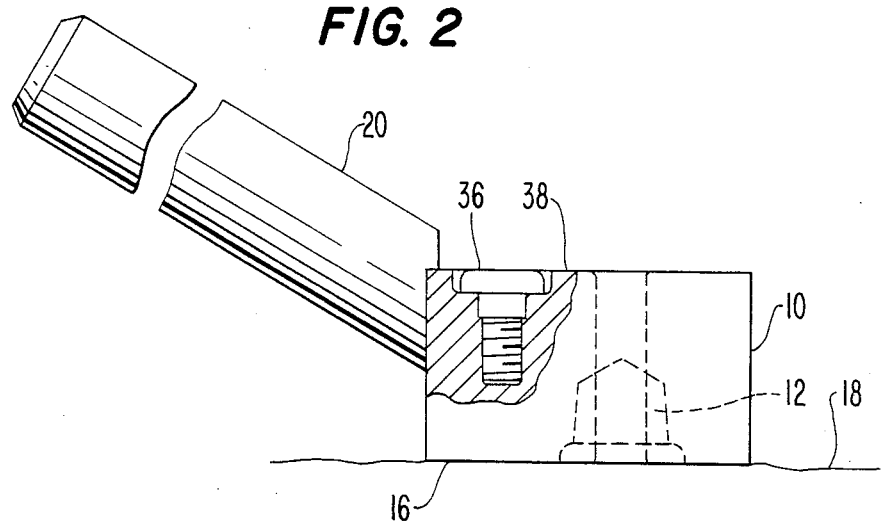
FIG. 2 is a side elevation of the fastener collar remover illustrated in FIG. 1.

In accordance with the present invention, there is provided a jig having opposed base and top surfaces and a cavity opened at said base surface and disposed to coaxially receive said collar when said base surface is disposed on said substrate. As shown in FIG. 2, jig 10 includes base surface 16 and top surface 38. Cavity 12 opens at base surface 16 and is disposed along first axis 14. Jig 10 is designed to fit over the collar of a fastener 26 (shown in FIG. 3) so that base surface 16 may be flush with the exterior surface 18 of a work object. It is preferred that jig 10 include handle 20 to allow jig 10 to be held in place during the collar removing process.

Also, in accordance with the invention, there is provided at least one drill bit bushing extending through said jig on an axis generally parallel to and spaced a predetermined distance from the axis of the cavity, said bushing being disposed to guide a drill bit into engagement with said collar when disposed in the cavity. In the preferred embodiment, as best shown in FIG. 3, two drill bit bushings 22 and 24 extend through jig 10 and have diameters co-linear with line III—III that passed through central axis 14. Bushings 22 and 24 axially extend through jig 10 along axes 30 and 32 respectively. Axes 30 and 32 are parallel to first axis 14. Bushings 22 and 24 are disposed in jig 10 to overlap edges 34 of collar 26. Thus, a drill bit guided into either bushing 22 or 24 will shear edge 34 of collar 26.

In accordance with the invention, the collar remover also includes adjustable means for controlling the axial length of a drill bit extending through the bushing. As embodied herein, adjustable means includes adjustable lock screw 36. Lock screw 36 is disposed on upper surface 38 of jig 10. When lock screw 36 is unscrewed, it serves as a spacer between the drill shank (not shown) and upper surface 38 of jig 10. Screw 36 can be adjusted to regulate the distance between the drill and top surface 38 thereby regulating the depth that a drill bit can penetrate bushings 22 and 24.

Use of the fastener collar remover will now be described. Initially, the user must adjust screw 36 to a position that prevents the distal end of the drill bit from penetrating jig 10 below lower surface 16. After the initial adjustment is made, the user positions cavity 12 over collar 26 of fastener 28. Holding handle 20, the user inserts a drill bit into either drill bit bushing 22 or 24 and applies a downward force to the turning bit. Since the drill bushings 22 and 24 overlap the edges of cavity 12, the turning drill bit shears edge 34 of collar 26 beneath the bushing. The same procedure is repeated for the second bushing. The fastener collar 26, sheared at two points, is then easily removed from the fastener by hand. When fastener collar 26 is made of a relatively soft metal, collar 26 may be removable after shearing collar 26 at only one point.

Additional advantages and modifications will readily occur to those skilled in the art. The invention in its broader aspects, is therefore, not limited to the specific details, representative apparatus and illustrative example shown and described. Accordingly, departures may be made from such details without departing from the spirit or scope of the general inventive concept as defined by the appended claims and their equivalents.

What is claimed is:

1. A device for removing a collar coaxially fixed to a projecting end of a fastener axially extending through the surface of a substrate, the device comprising:

a jig having opposed base and top surfaces and a cavity open at said base surface and disposed to coaxially receive said collar when said base surface is disposed on said substrate;

at least one drill bit bushing extending through said jig on an axis generally parallel to and spaced a predetermined distance from the axis of said cavity, said bushing being disposed to guide a drill bit into engagement with said collar when disposed in said cavity; and adjustable means for controlling the axial length of drill bit extending through said bushing.

2. A device as set forth in claim 1, wherein said adjustable means comprises a lock screw adjustably extending from said top surface.

3. A device as set forth in claim 1, further comprising a handle portion extending from said jig.

4. A device as set forth in claim 1, wherein said at least one drill bit bushing includes two drill bit bushings extending through said jig on an axes parallel to and radially oppositely spaced predetermined distances from the axis of said cavity, said two drill bit bushings being disposed to guide drill bits into engagement with radially opposite sides of said collar when disposed in said cavity.

* * * * *